United States Patent
Kirmaier et al.

(10) Patent No.: US 12,497,016 B2
(45) Date of Patent: Dec. 16, 2025

(54) TRAILER BRAKE TEMPERATURE ESTIMATION

(71) Applicant: AGCO International GmbH, Neuhausen (CH)

(72) Inventors: Philipp Kirmaier, Marktoberdorf (DE); Manuel Abel, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/819,174

(22) Filed: Aug. 29, 2024

(65) Prior Publication Data

US 2025/0074384 A1   Mar. 6, 2025

(30) Foreign Application Priority Data

Sep. 1, 2023   (GB) ..................................... 2313366

(51) Int. Cl.
| | |
|---|---|
| *B60T 17/00* | (2006.01) |
| *B60K 35/28* | (2024.01) |
| *B60T 7/20* | (2006.01) |
| *B60T 17/22* | (2006.01) |
| *F16D 66/00* | (2006.01) |

(52) U.S. Cl.
CPC .............. *B60T 17/22* (2013.01); *B60K 35/28* (2024.01); *B60T 7/20* (2013.01); *F16D 66/00* (2013.01); *B60K 2360/178* (2024.01); *B60T 2201/03* (2013.01); *B60T 2210/20* (2013.01); *B60T 2250/04* (2013.01); *F16D 2066/001* (2013.01); *F16D 2066/005* (2013.01); *F16D 2066/006* (2013.01)

(58) Field of Classification Search
CPC .......... B60T 17/22; B60T 17/221; B60T 7/20; B60T 2201/03; B60T 2201/04; B60T 2201/20; B60T 2250/04; B60T 8/172; B60T 8/323; B60T 13/662; B60T 8/1708; B60K 35/28; B60K 2360/178; F16D 66/00; F16D 2066/001; F16D 2066/005; F16D 2066/006
See application file for complete search history.

(56) References Cited

U.S. PATENT DOCUMENTS

| | | | | |
|---|---|---|---|---|
| 9,428,190 | B2 * | 8/2016 | Weston | B60W 10/04 |
| 11,964,647 | B2 * | 4/2024 | Kirmaier | B60T 8/1708 |
| 2004/0036592 | A1 * | 2/2004 | Vertenten | B60T 17/221 |
| | | | | 340/453 |

(Continued)

FOREIGN PATENT DOCUMENTS

JP   H05105075 A   4/1993

OTHER PUBLICATIONS

UK Intellectual Property Office, Search Report for related UK Application No. GB2313366.3, dated Feb. 15, 2024, 4 pages.

*Primary Examiner* — Phutthiwat Wongwian
*Assistant Examiner* — Sherman D Manley

(57) ABSTRACT

A system and method are provided for brake temperature estimation of a trailer. The incline of the surface along which the trailer is being towed is sensed, as well as a brake line pressure to the trailer and the speed. A braking count is derived from braking time periods and a downhill count is derived from downhill driving time periods. An indicator of the brake temperature is then based on the braking count and the downhill count.

17 Claims, 2 Drawing Sheets

(56) References Cited

U.S. PATENT DOCUMENTS

| | | | |
|---|---|---|---|
| 2004/0090347 A1* | 5/2004 | Yoshino | B60T 17/221 340/933 |
| 2009/0198427 A1* | 8/2009 | Christopher Jackson | B60T 13/662 188/1.11 R |
| 2015/0027823 A1* | 1/2015 | Murata | B60T 7/12 188/162 |
| 2016/0138665 A1* | 5/2016 | Antanaitis | B60T 17/22 701/70 |

* cited by examiner

TRAILER BRAKE TEMPERATURE ESTIMATION

CROSS-REFERENCE TO RELATED APPLICATION

This application claims the benefit of the filing date of U.K. Patent Application 2313366.3, "Trailer Brake Temperature Estimation," filed Sep. 1, 2023, the entire disclosure of which is incorporated herein by reference.

FIELD

Embodiments of the present disclosure relate generally to brake temperature estimation, in particular for a towed trailer having a braking system which is controlled from the towing vehicle.

BACKGROUND

Many vehicles are provided with attached trailers for the transportation of goods and materials. For large-scale use such trailers may be provided with trailer braking systems to allow for safe control of the trailer, and to prevent jack-knifing or skidding of the trailer when braking.

Both jack-knifing and skidding occur when the force applied by the trailer to the towing vehicle, also referred to as coupling force, exceeds a certain level. The coupling force is mainly generated by the trailer weight and the inertia during breaking. A first effect of an excessive coupling force is that the towing vehicle is excessively pushed and the vehicle's track guiding forces are overcome. This results in a yaw moment and hence movement about the vertical vehicle axis of the towing vehicle which cannot be overcome by the wheel-ground contact. The towing vehicle then starts to skid.

These effects especially appear when the vehicle is decelerated without the driver activating the vehicle service brake system and occur when downshifting a continuously variable transmission or using a retarder in trucks.

It is well known that these effects can be reduced by activating the brakes of the trailer depending on the coupling force to stabilize the vehicle combination. However, the brake activation must be appropriately applied to reduce the coupling force but also to avoid that excessive braking destabilizes the vehicle combination as the combination is stretched excessively which would also apply a yaw moment to the towing vehicle.

Trailers used in combination with trucks mainly use information of on-board assistant systems like electronic trailer suspension, ABS, ESP, ASR to determine the coupling force. Especially the trailer suspension helps to determine the weight of the trailer, and other sensors help to fine tune the brake actuation by determining wheel speeds and accelerations.

Focusing now on agricultural vehicle combinations, mainly tractors and agricultural trailers, such trailers are rarely equipped with on-board assistant systems like electronic trailer suspension, ABS, ESP, ASR and therefore the coupling force is difficult to determine.

It has been recognized that in such situations it is advantageous to monitor the health of the trailer brake systems, particularly when the brake force is controlled independently of the driver's input systems as is the case in trailer braking assist systems. One example of a potential fault is known as "brake fading," resulting from brake element overheating.

European Patent Application Publication EP 1441938A1, "A Method and a System at a Commercial Vehicle," published Aug. 4, 20024, discloses determining the trailer brake temperature using the trailer brake signal (or pressure) and the duration of the brake actuation generated by the tractor control system. However, the temperature determination may be inappropriate as influencing parameters such as the weight of the trailer are mostly not known for agricultural trailers. The system also performs complex computations and requires detailed knowledge of the characteristics of the towing vehicle and trailer.

There is therefore a need for an improved brake temperature estimation that is simple to implement and can be applied to a range of towing vehicles and trailers.

BRIEF SUMMARY

In some embodiments, a system for brake temperature estimation of a vehicle-towed trailer includes a sensor for sensing an incline of the surface along which the trailer is being towed; a pressure sensor for sensing a brake line pressure to the trailer; a vehicle speed sensor for sensing a speed at which the trailer is being towed; and a processor. The processor is configured to identify that braking is taking place based on the brake line pressure exceeding a pressure threshold; maintain a braking count relating to braking time periods by incrementing the braking count by a first amount for time periods when the velocity exceeds a velocity threshold and the brake line pressure exceeds the pressure threshold and otherwise decreasing the braking count by a second amount, smaller than the first amount; identify that downhill driving is taking place based on the incline being below an incline threshold and maintaining a downhill count of downhill driving time periods; derive an indicator of the brake temperature based on the braking count and the downhill count; and provide brake temperature information to the driver of the towing vehicle.

This brake temperature estimation uses two counts to derive temperature information. One count relates to the amount of braking, in particular a count based on the time periods when there is braking applied and a sufficient velocity to cause brake heating. The other count relates to the incline, in particular a count of the time periods when driving downhill. It is noted that the detection of the incline will typically be performed at the towing vehicle (e.g., tractor) since the trailer will subsequently be on that incline. The incline could however be measured at the trailer. The disclosure thus provides a computationally simple approach for deriving a temperature estimate, and which can use only existing sensor data available from the towing vehicle.

The first and second amounts may by the same (e.g., 1 count value so that the overall count corresponds to a net braking time). The second amount in a preferred example is however smaller than the first amount. The braking count then increases rapidly during braking but decreases more slowly when not braking, to take account of the different heating and cooling rates.

The processor is for example configured to reset the downhill count to zero when the incline ceases to be below the incline threshold, or when the incline ceases to be below the incline threshold for a predetermined period of time.

The brakes are under a lower load once the trailer stops travelling downhill and the downhill count can be reset.

The processor is for example configured to compare the brake count with a first brake count threshold; compare the downhill count with a downhill count threshold; and provide a first level of brake heating warning, as the brake temperature information, if the first brake count threshold and downhill count threshold are exceeded.

In this way, a brake heating warning is derived from two simple counter comparisons. The downhill count is increased when the trailer moves on an incline having a downhill inclination greater than the incline threshold (based on the incline typically being detected at the vehicle towing the trailer).

The processor is for example configured to compare the brake count with a second brake count threshold, greater than the first brake count threshold; and provide a second level of brake heating warning, as the brake temperature information, if the second brake count threshold and downhill count threshold are exceeded.

Thus, different levels of brake heating warning may be provided depending on the level of the brake count (i.e., based on the amount of time during which braking has taken place above a threshold velocity).

The system for example comprises a trailer braking assist function for controlling the trailer braking independent of the manual control of the driver of the towing vehicle, wherein the processor is configured to deactivate the trailer braking assist function in response to the second level of brake heating warning.

In this way, automatic braking is disabled when it is likely that it may result in excessive brake heating.

The processor is for example configured to maintain the trailer braking assist function deactivated until the braking count at least falls back to the second brake count threshold or the downhill count has reset to zero. Thus, the trailer braking assist function may be re-enabled once the trailer is no longer traveling downhill, or there has been interruption in braking to allow the brakes to cool. The driver may for example additionally be required to reactivate the function via a button in the terminal.

The processor is for example configured to maintain the trailer braking assist function deactivated until the braking count falls below the second brake count threshold, preferably by a hysteresis amount, or the downhill count has reset to zero. This hysteresis amount avoids the braking assist function toggling on and off too rapidly.

The disclosure also provides an agricultural vehicle couplable to a trailer to form a vehicle-trailer combination, comprising the brake temperature estimation system as described above for estimating the brake temperature of coupled trailer.

The agricultural vehicle for example comprises trailer braking assist system for automatic control of the trailer braking independent of the manual control of the driver of the agricultural vehicle, wherein the brake temperature estimation system is configured to activate and deactivate the trailer braking assist system. Thus, a trailer braking assist function may be enabled and disabled based on an estimated level of brake heating.

The disclosure also provides a vehicle-trailer combination comprising the agricultural vehicle defined above and a trailer, wherein the trailer has pneumatically actuated brakes which are controllable from the agricultural vehicle.

The disclosure also provides a method of brake temperature estimation of a trailer, including receiving a sensed incline of the surface along which the trailer is being towed; receiving a sensed brake line pressure to the trailer; receiving a sensed speed at which the trailer is being towed; identifying that breaking is taking place based on the brake line pressure exceeding a pressure threshold; maintaining a braking count relating to braking time periods by incrementing the braking count by a first amount for time periods when the velocity exceeds a velocity threshold and the brake line pressure exceeds the pressure threshold and otherwise decreasing the braking count; identifying that downhill driving is taking place based on the incline being below an incline threshold and maintaining a downhill count of downhill driving time periods; deriving an indicator of the brake temperature based on the braking count and the downhill count; and providing brake temperature information to the driver of the towing vehicle.

The second amount is for example smaller than the first amount. The method may include resetting the downhill count to zero when the incline ceases to be below the incline threshold, or when the incline ceases to be below the incline threshold for a predetermined period of time.

The method may include comparing the brake count with a first brake count threshold; comparing the brake count with a second brake count threshold, greater than the first brake count threshold; comparing the downhill count with a downhill count threshold; providing a first level of brake heating warning, as the brake temperature information, if only the first brake count threshold and downhill count threshold are exceeded; and providing a second level of brake heating warning, as the brake temperature information, if the second brake count threshold and downhill count threshold are exceeded.

The method may also include deactivating a trailer braking assist function in response to the second level of brake heating warning.

The disclosure also provides a computer program having computer program code adapted, when the program is run on a computer, to implement the method defined above.

Various aspects, embodiments, examples and alternatives set out herein, and individual features thereof may be taken independently or in any possible and compatible combination. Where features are described with reference to a single aspect or embodiment, such features are applicable to all aspects and embodiments unless otherwise stated or where such features are incompatible.

BRIEF DESCRIPTION OF THE DRAWINGS

Embodiments will now be described, by way of example only, with reference to the accompanying drawings, in which.

DETAILED DESCRIPTION

Figure 1:
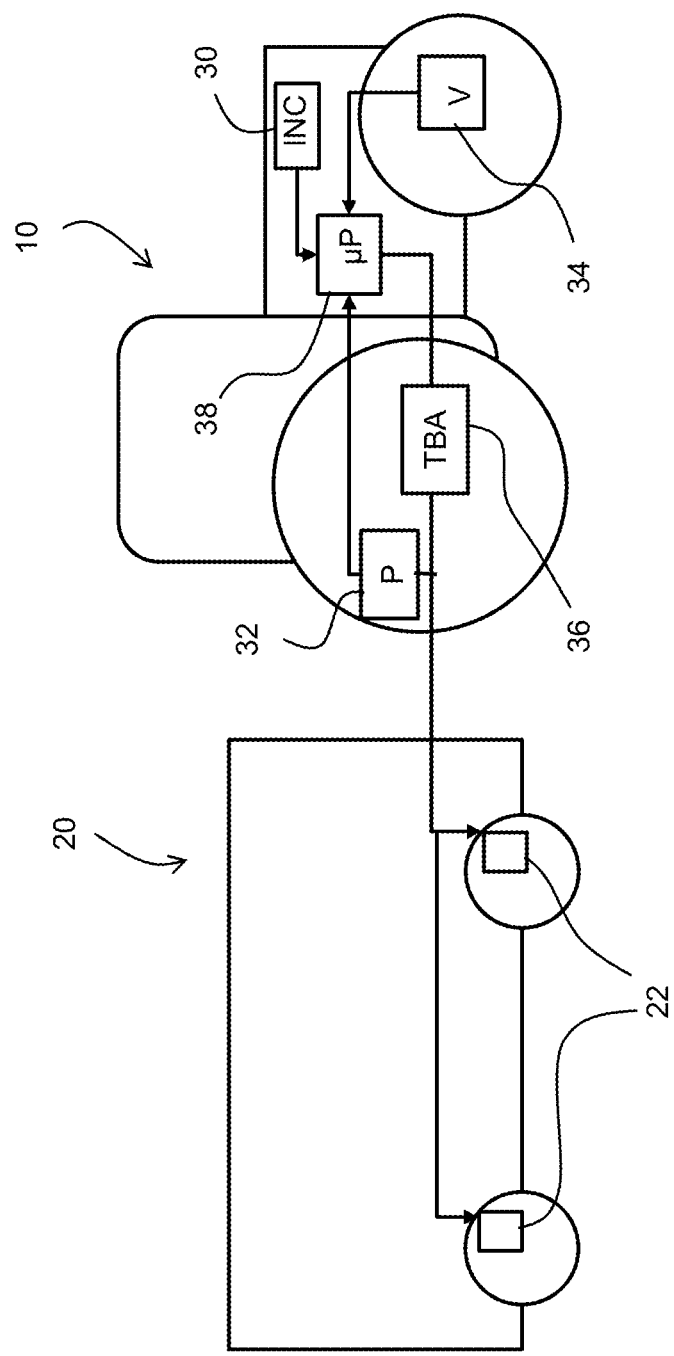
FIG. 1 shows an agricultural vehicle coupled to a trailer to form a vehicle-trailer combination.

It should be understood that the detailed description and specific examples, while indicating exemplary embodiments of the apparatus, systems and methods, are intended for purposes of illustration only and are not intended to limit the scope of the disclosure. These and other features, aspects, and advantages of the apparatus, systems and methods of the present disclosure will become better understood from the following description, appended claims, and accompanying drawings. It should be understood that the figures are merely schematic and are not drawn to scale. It should also be understood that the same reference numerals are used throughout the figures to indicate the same or similar parts.

This disclosure provides a system and method for brake temperature estimation of a trailer. The incline of the surface along which the trailer is being towed is sensed, as well as a brake line pressure to the trailer and the speed. A braking count is derived from braking time periods and a downhill count is derived from downhill driving time periods. An indicator of the brake temperature is then based on the braking count and the downhill count.

FIG. 1 shows an agricultural vehicle 10 coupled to a trailer 20 to form a vehicle-trailer combination. The agricultural vehicle 10 in this example is a tractor and it tows the trailer 20.

The trailer 20 has brakes 22 which are controlled from the agricultural vehicle 10. The brakes may be controlled manually by the tractor driver, but additionally by an automatic braking system. The automatic braking system for example applies braking to the trailer 20 as a function of the coupling force between the trailer and the tractor in known manner, as explained above. This automated braking control will be termed a "trailer braking assist function" in this disclosure. The braking provided is independent of the manual control of the driver of the agricultural vehicle 10.

This disclosure is not limited to any particular implementation of the trailer braking assist function, and thus may rely on the indirect assessment of coupling forces or on other sensor measurements.

The agricultural vehicle 10 has a brake temperature estimation system for estimating the brake temperature of the coupled trailer 20. In a most basic implementation, the brake temperature estimation system is simply for assessing the health of the braking system of the trailer and advising the driver of the towing vehicle so that the driver may take appropriate action. However, in an implementation as described below, the brake temperature estimation system also interfaces with a trailer braking assist function 36 so that overheating of the trailer brakes as a result of the trailer braking assist function is avoided. In particular, brake temperature estimation is used to activate and deactivate the trailer braking assist function. Thus, the trailer braking assist function may be enabled and disabled based on an estimated level of brake heating.

The system for brake temperature estimation comprises a sensor 30 for sensing an incline of the surface along which the trailer is being towed, a pressure sensor 32 for sensing a brake line pressure to the trailer 20 and a vehicle speed sensor 34 for sensing a speed at which the trailer 20 is being towed. These sensors are all commonly present in the agricultural vehicle 10, as here the towing tractor. The brake line pressure is for example controlled manually by the driver of the tractor, or may be controlled automatically by the trailer braking assist function.

A processor 38 processes the pressure, velocity and incline information in order to determine a level of brake heating of the brakes of the trailer. As explained below, the processor uses a simple counter-based system to estimate a level of brake heating. Counters update at a fixed refresh rate, such as every 20 ms, so that the counter values correspond to time periods.

It can be determined that braking is taking place based on the brake line pressure P exceeding a pressure threshold Pth. A braking count B_count is then maintained relating to braking time periods. In some implementations, the braking count is not a simple count of braking periods (although this is an option), but it is weighted. The braking count B_count for example increases by a first amount (e.g., 4 counts) for time periods when the velocity V exceeds a velocity threshold Vth and the brake line pressure P exceeds the pressure threshold Pth. Thus, braking is concluded when the brake pressure is above a threshold (e.g., 0.50 bar=50 kPa) and when the vehicle is traveling above a threshold speed (e.g., 5 km/h).

Otherwise, the braking count B_count is decreased. The decrease may be by a second amount, e.g., 1 count, smaller than the first amount. The weighting results from the different values of the first and second amounts.

The incline sensor is able to identify that downhill driving is taking place, in particular if the incline/is below an incline threshold Ith. A downhill count D_count of downhill driving time periods may then also be derived.

The processor 38 derives an indication of the brake temperature based on the braking count and the downhill count.

Brake temperature information may then be provided to the driver of the agricultural vehicle 10. As mentioned above, the information may optionally also be used to enable and disable the trailer braking assist function.

Figure 2:
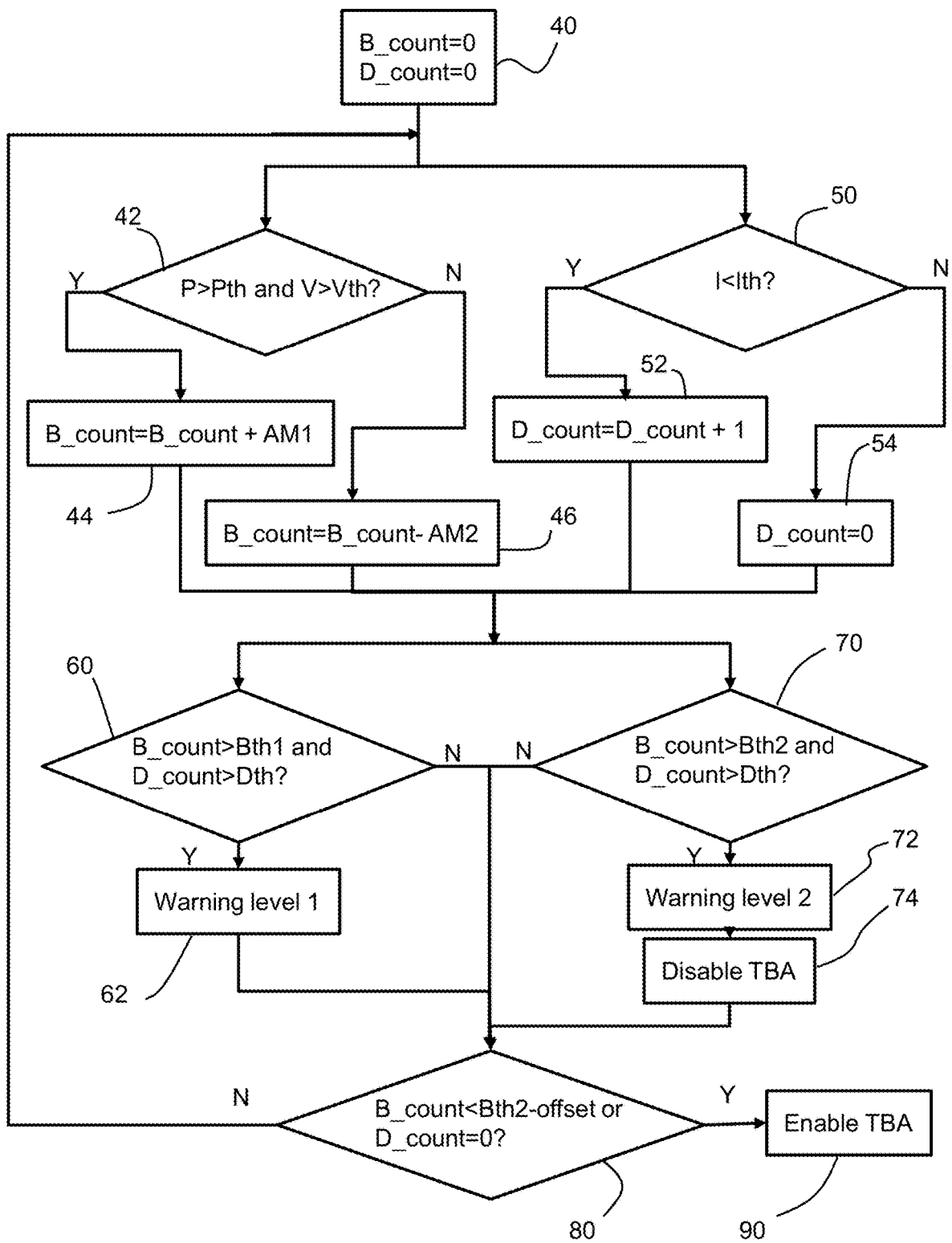
FIG. 2 shows the method implemented by the processor of FIG. 1.

FIG. 2 shows the method implemented by the processor 38. This method provides brake temperature estimation using two counts as outlined above. The braking count B_count relates to the amount of braking, in particular a weighted count of time periods when there is braking applied and a sufficient velocity to cause brake heating. The downhill count D_count relates to the incline, in particular a count of the time periods when driving downhill.

In step 40, the braking count and downhill count are reset.

The method is performed iteratively, with a cycle of fixed duration, such as 20 ms.

In step 42, it is determined if the brake line pressure P exceeds a pressure threshold Pth and the velocity V exceeds a velocity threshold Vth. If so, the braking count B_count is increased by a first amount AM1 in step 44. This amount may be 4 count units, so that the count is not a simple count of braking time periods, but has a weighting applied as explained above. If the conditions are not met, the braking count B_count is decreased by a second amount AM2 in step 46. This amount may be 1 count unit. Thus, the braking count drops more slowly than it increases in this preferred example, to take account of the quicker brake heating compared to brake cooling (by an assumed factor of 4 in this example). Of course, other weighting factors may be applied.

The incline is also analyzed in step 50. If the incline/is below the threshold Ith, such as −2 degrees (although any other suitable threshold may be used, for example in the range −1 degree to −5 degrees), the downhill count D_count is increased by 1 in step 52. This is based on a positive inclination representing uphill and a negative inclination representing downhill. Of course, the opposite naming convention may be used. If the incline is above the threshold (so a low downhill slope, flat, or uphill) then the downhill count D_count is reset to zero in step 54. The reset may instead take place only when the incline ceases to be below the incline threshold for a predetermined period of time.

The braking count and downhill count are then assessed.

In step 60 it is determined if the braking count B_count is above a first threshold Bth1 (e.g., 30,000, which would be achieved by continuous braking for 150 s=30,000/AM1× 0.02) and the downhill count is above a downhill count threshold (e.g., 250, corresponding to a time period of 5 seconds). If these conditions are met, a first level warning is provided in step 62.

In step 70 it is determined if the braking count B_count is above a second threshold Bth2 (e.g., 40,000, which would be reached by continuous braking for 200 s=40,000/AM1× 0.02) and the downhill count is again above the downhill count threshold. If these conditions are met, a second level warning is provided in step 72. This may be provided as well as, or instead of, the first level warning. The second brake counter threshold is greater than the first brake count threshold so that it corresponds to a longer period of braking (while above the velocity threshold).

The brake heating warnings are thus derived from two simple counter comparisons.

If the brakes have already been used are therefore already warm, a short period of downhill driving (e.g., 5 s) may be enough to overheat the brakes. If the brakes are initially cold, a longer period of downhill driving and braking will be possible before overheating (e.g., 150 s or 200 s). Of course, the thresholds and values of AM1 and AM2 may be set differently to provide different system response.

As explained above, the system preferably comprises a trailer braking assist function for controlling the trailer braking independent of the manual control of the driver of the towing vehicle. In step 74 the processor deactivates the trailer braking assist function in response to the second level of brake heating warning. In this way, automatic braking is disabled when it is likely that it may result in excessive brake heating.

The method is then repeated cyclically.

The trailer braking assist function will remain disabled until a test in step 80 is satisfied. This test requires the braking count B_count to fall back at least to the second brake count threshold Bth2 or requires the downhill count D_count to have been reset to zero (in step 54). Thus, the trailer braking assist function may be re-enabled once the trailer is no longer traveling downhill, or there has been interruption in braking to allow the brakes to cool. The trailer braking assist is then re-enabled in step 90. This may happen automatically, but may alternatively require driver input to re-enable the trailer braking assist function.

In the example of FIG. 2, the braking count B_count is required to fall back to the second brake count threshold Bth less an offset. This provides a hysteresis to the functionality. This hysteresis amount avoids the braking assist function toggling on and off too rapidly.

The values of the various thresholds given above, the count increments, and the cycle period of the process, are of course purely by way of example. The performance of the system may be optimized for different combinations of agricultural vehicle 10 and trailer 20.

Within the scope of this disclosure, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

Functions implemented by a processor may be implemented by a single processor or by multiple separate processing units which may together be considered to constitute a "processor." Such processing units may in some cases be remote from each other and communicate with each other in a wired or wireless manner.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

All references cited herein are incorporated herein in their entireties. If there is a conflict between definitions herein and in an incorporated reference, the definition herein shall control.

What is claimed is:

1. A system for brake temperature estimation of a vehicle towed trailer, comprising:
    a sensor configured to sense an incline of a surface along which the trailer is being towed;
    a pressure sensor configured to sense a brake line pressure to the trailer;
    a vehicle speed sensor configured to sense a speed at which the trailer is being towed; and
    a processor configured to:
        receive pressure data from the pressure sensor;
        responsive to receiving pressure data indicating that the brake line pressure exceeds a pressure threshold, determine that braking is taking place;
        maintain a braking count relating to braking time periods by incrementing the braking count by a first amount for time periods in which the velocity exceeds a velocity threshold and the brake line pressure exceeds the pressure threshold and otherwise decreasing the braking count by a second amount;
        receive inclination data from the sensor;
        responsive to receiving inclination data indicating that the incline is below an incline threshold, determine that downhill driving is taking place and maintain a downhill count of downhill driving time periods;
        based on the brake count and the downhill count, determine an indicator of the brake temperature; and
        cause brake temperature information to be displayed upon a display of the towing vehicle.

2. The system of claim 1, wherein the second amount is smaller than the first amount.

3. The system of claim 1, wherein the processor is configured to reset the downhill count to zero when the incline ceases to be below the incline threshold.

4. The system of claim 3, wherein the processor is configured to reset the downhill count to zero when the incline ceases to be below the incline threshold for a predetermined period of time.

5. The system of claim 1, wherein the processor is configured to:
    compare the brake count with a first brake count threshold;
    compare the downhill count with a downhill count threshold; and
    cause a first level of brake heating warning to be displayed upon the display, as the brake temperature information, if the first brake count threshold and downhill count threshold are exceeded.

6. The system of claim 5, wherein the processor is configured to:
    compare the brake count with a second brake count threshold greater than the first brake count threshold;
    cause a second level of brake heating warning to be displayed upon the display, as the brake temperature information, if the second brake count threshold and downhill count threshold are exceeded.

7. The system of claim 6, further comprising a trailer braking assist function for controlling the trailer braking independent of a manual control of the driver of the towing vehicle, wherein the processor is configured to deactivate the trailer braking assist function in response to the second level of brake heating warning.

8. The system of claim 7, wherein the processor is configured to maintain the trailer braking assist function deactivated until the braking count at least falls back to the second brake count threshold or the downhill count has reset to zero.

9. The system of claim 8, wherein the processor is configured to maintain the trailer braking assist function deactivated until the braking count falls below the second brake count threshold, or the downhill count has reset to zero.

10. The system of claim 9, wherein the processor is configured to maintain the trailer braking assist function deactivated until the braking count falls below the second brake count threshold by a hysteresis amount, or the downhill count has reset to zero.

11. An agricultural vehicle couplable to a trailer to form a vehicle-trailer combination comprising the brake temperature estimation system of claim 1 for estimating the brake temperature of the coupled trailer.

12. The agricultural vehicle of claim 11, further comprising a trailer braking assist system configured to automatically control the trailer braking independent of a manual control of the driver of the agricultural vehicle, wherein the brake temperature estimation system is configured to activate and deactivate the trailer braking assist system.

13. A vehicle-trailer combination comprising the agricultural vehicle of claim 12 and a trailer, wherein the trailer has pneumatically actuated brakes which are controllable from the agricultural vehicle.

14. A method of brake temperature estimation of a trailer, comprising:
receiving a sensed incline of a surface along which the trailer is being towed by a towing vehicle;
receiving a sensed brake line pressure to the trailer;
receiving a sensed speed at which the trailer is being towed;
responsive to the sensed brake line pressure exceeding a pressure threshold, determining that breaking is taking place;
maintaining a braking count relating to braking time periods by incrementing the braking count by a first amount for time periods when the velocity exceeds a velocity threshold and the brake line pressure exceeds the pressure threshold and otherwise decreasing the braking count by a second amount;
responsive to the sensed incline being below an incline threshold, determining that downhill driving is taking place and maintaining a downhill count of downhill driving time periods;
based on the braking count and the downhill count, determining an indicator of the brake temperature; and
causing brake temperature information to be displayed upon a display of the towing vehicle.

15. The method of claim 14, comprising:
comparing the brake count with a first brake count threshold;
comparing the brake count with a second brake count threshold greater than the first brake count threshold;
comparing the downhill count with a downhill count threshold;
causing a first level of brake heating warning to be displayed upon the display, as the brake temperature information, if only the first brake count threshold and downhill count threshold are exceeded; and
causing a second level of brake heating warning to be displayed upon the display, as the brake temperature information, if the second brake count threshold and downhill count threshold are exceeded.

16. The method of claim 15, further comprising deactivating a trailer braking assist function in response to the second level of brake heating warning.

17. A non-transitory computer-readable medium comprising processor-executable instructions that when executed are configured to perform operations, the operations comprising:
receiving a sensed incline of a surface along which a trailer is being towed by a towing vehicle;
receiving a sensed brake line pressure to the trailer;
receiving a sensed speed at which the trailer is being towed;
responsive to the sensed brake line pressure exceeding a pressure threshold, determining that breaking is taking place;
maintaining a braking count relating to braking time periods by incrementing the braking count by a first amount for time periods when the velocity exceeds a velocity threshold and the brake line pressure exceeds the pressure threshold and otherwise decreasing the braking count by a second amount;
responsive to the sensed incline being below an incline threshold, determining that downhill driving is taking place and maintaining a downhill count of downhill driving time periods;
based on the braking count and the downhill count, determining an indicator of the brake temperature; and
causing brake temperature information to be displayed upon a display of the towing vehicle.

\* \* \* \* \*